(12) United States Patent
Verma et al.

(10) Patent No.: US 10,540,326 B2
(45) Date of Patent: Jan. 21, 2020

(54) DYNAMIC CACHING SYSTEM

(71) Applicant: MAKEMYTRIP (INDIA) PRIVATE LIMITED, New Delhi (IN)

(72) Inventors: Akshat Verma, New Delhi (IN); Zafar Ansari, New Delhi (IN); Anirban Basu, New Delhi (IN); Abhilash Jain, New Delhi (IN); Pawan Kumar, New Delhi (IN); Sunil Kumar, New Delhi (IN); Vineet Pandita, New Delhi (IN); Dhawal Patel, New Delhi (IN); Rakesh Ranjan, New Delhi (IN); Shubham Srivastava, New Delhi (IN); Sharat Singh, New Delhi (IN)

(73) Assignee: MAKEMYTRIP (INDIA) PRIVATE LIMITED, New Delhi (IN)

( * ) Notice: Subject to any disclaimer, the term of this patent is extended or adjusted under 35 U.S.C. 154(b) by 1004 days.

(21) Appl. No.: 15/008,679

(22) Filed: Jan. 28, 2016

(65) Prior Publication Data
US 2017/0052976 A1 Feb. 23, 2017

(30) Foreign Application Priority Data
Aug. 21, 2015 (IN) .......................... 2605/DEL/2015

(51) Int. Cl.
*G06F 16/00* (2019.01)
*G06F 16/174* (2019.01)
(Continued)

(52) U.S. Cl.
CPC ........ *G06F 16/1748* (2019.01); *G06F 16/162* (2019.01); *G06F 16/24535* (2019.01); *G06F 16/24552* (2019.01)

(58) Field of Classification Search
None
See application file for complete search history.

(56) References Cited

U.S. PATENT DOCUMENTS

8,738,446 B1 * 5/2014 L'Heureux ........ G06Q 30/0277
705/14.54
2003/0200194 A1 * 10/2003 Arnold .............. G06F 16/24552
(Continued)

*Primary Examiner* — Son T Hoang
(74) *Attorney, Agent, or Firm* — Barry Choobin; Patent 360 LLC (57) ABSTRACT

A dynamically correcting cache memory is capable of correcting itself by dynamically reflecting any modifications inflicted upon the data/information to be stored therein. Further, the cache memory is refreshed at predetermined time intervals and also based on predetermined criteria, thereby ensuring a high cache hit rate. The dynamically correcting cache memory is bypassed for certain user queries prioritized based on a predetermined criteria. The dynamically correcting cache manages an inventory shared between multiple non-cooperative web-based, computer-implemented platforms. The dynamically correcting cache is directed to reducing caching errors in web based computer implemented platforms. The dynamically correcting cache responds to rapid changes associated with (online) behavior of users accessing web based computer implemented platforms by dynamically configuring TTL (Time-To-Live) values, in order to ensure that the data/information stored in the cache memory remains accurate.

23 Claims, 2 Drawing Sheets

(51) Int. Cl.
    *G06F 16/16* (2019.01)
    *G06F 16/2453* (2019.01)
    *G06F 16/2455* (2019.01)

(56) References Cited

U.S. PATENT DOCUMENTS

2005/0234804 A1* 10/2005 Fang .................. G06Q 30/08
                                                    705/37
2010/0332513 A1* 12/2010 Azar ................ G06F 16/24545
                                                    707/769

* cited by examiner

DYNAMIC CACHING SYSTEM

CROSS-REFERENCE TO RELATED APPLICATION

The present invention claims the priority of the Indian Provisional Patent Application with number 2605/DEL/2015 filed on Aug. 21, 2015 with the title "A SYSTEM AND METHOD FOR DYNAMICALLY CORRECTING CACHING SYSTEMS", the contents of the above mentioned patent application is included in its entirety as reference herein.

BACKGROUND

Technical Field

The present disclosure relates to caching systems implemented in web based computer systems. Particularly, the present disclosure relates to caching systems operable in a networked environment incorporating non-cooperating computer systems.

Description of Related Art

Web based travel platforms and web based commerce platforms are typical examples of non-cooperating systems implemented in a networked computing environment Aforementioned Platforms link suppliers to customers via dedicated programmed interfaces and enable customers to inter-alia query for, search, review, and select the products/services on offer, in addition to enabling suppliers to offer products/services for sale.

In a typical networked computing environment, either a 'push model' or a 'pull model' is utilized to provide to customers the data and information corresponding to the products/services on offer. In case of a push model, suppliers publish the information corresponding to the products/services on offer, on various programmable interfaces. Push model is effective in scenarios where there are a limited number of suppliers offering products/services to customers, and also in scenarios where the products/services on offer are not known to be seasonal and fast moving.

In case of a pull model, a centralized data repository stores the data and information corresponding to the products/services offered (by respective suppliers) via various programmed interfaces, to customers. Subsequently, programmed interfaces access the centralized database via dedicated APIs (Application Program Interface), to receive and display (to the customers) the products/services on offer, preferably along with relevant information such as availability, price, and the like.

For example, a web based programmed interface (portal) offering hotel accommodation to customers typically employs the 'push model', wherein all the data and information corresponding to available hotel accommodations is uploaded on to a centralized repository. Subsequently, various programmed interfaces access the centralized repository via dedicated APIs, preferably in order to respond to a query pertaining to hotel accommodations. Typically, a query pertaining to hotel accommodations comprises information corresponding to check-in date, check-out date, preferred destination, preferred class of service, and level of occupancy. A typical answer to such a query would include information corresponding to the pricing and availability of relevant hotel accommodation.

Typically, hotel accommodations prices are decided by suppliers based on the class of service preferred by customers, dates preferred by customers and the corresponding occupancy rates inter-alia. Further, pricing of hotel accommodations is also impacted by the time period during which the hotel accommodation is requested and also based on the duration of time for which accommodation is requested. Hotel accommodations are priced dynamically based on a plurality of factors including check-in date, check-out date, preferred destination, preferred class of service, and level of occupancy. And further, it is common that the pricing strategy followed by suppliers changes with a change in any of the aforementioned factors.

Therefore, in order to accommodate dynamicity in the pricing strategy and to accommodate any rapid modifications in pricing strategy, and also to enhance user experience, any programmed interface catering, to the demands for fast moving services is compelled to maintain a caching platform for storing information that is frequently accessed/queried for by customers. In a typical networking environment, individual cache memory modules are maintained every programmed interface offering products/services for sale. Each of the said cache memory modules derive data and information from a centralized repository which incorporates the information typically provided by the suppliers of products/services, and required to be displayed on the programmed interfaces.

Cache memory nodules dedicated to individual programmed interfaces are a necessity given the need for frequently accessed/frequently queried information to be provided to users (of programmed interfaces) within a shortest possible response time. In order to achieve shortest possible response time, and thereby enhance the user experience, programmed interfaces store the frequently accessed information in dedicated cache memory modules. Typically, any frequently accessed/frequently queried information is retrieved from corresponding cache memory module for display by programmed interfaces. Individual cache memory modules communicate with the centralized repository, typically after elapse of a predetermined time interval, to ensure that the information stored therein accurately corresponds to the information (originally provided by suppliers) stored in the centralized repository. In the event that the information stored in the centralized repository is modified, the individual cache memory modules are updated about the modifications (to the information stored in the centralized repository) at pre-determined time intervals by dedicated APIs which are used by programmed interfaces to access the centralized repository.

Typically, in the event that the information provided by the supplier is to be modified, for example, an increase/decrease in prices of hotel accommodation during a festive season, or changes in availability levels of hotel accommodations corresponding to a particular class of service, the supplier reflects the modifications on the information stored in the centralized repository. The modifications reflected on the information stored in the centralized repository are subsequently reflected upon corresponding frequently accessed/queried information stored in individual cache memory modules. The information stored in individual cache memory modules is typically associated with a pre-calculated TTL (Time-To-Live) period. After the expiry of the TTL period, the cache memory modules access the centralized repository to check for and selectively incorporate any updates/modifications inflicted on the information originally stored in the centralized repository.

However, the complexity associated with calculating an ideal TTL increases with an increase in the rate at which the information (provided by the supplier) stared in the centralized repository is modified. With the information stored in the centralized repository being modified repeatedly (either by suppliers, or due to changes in inventory levels, or due to a surge/decrease cache memory modules with modified information, if it is determined that the updates reflected on the centralized repository are found to have implications on the frequently accessed/queried information stored in individual cache memory modules. However, pre-calculating a TTL value by forecasting the rate at which the centralized repository might be updated is a challenging task yet to be efficiently addressed.

Further, caching system already known in the art typically implement a TTL (Time-To-Live) period based scheme which includes defining a TTL for every data item (dab point) stored in a repository. Subsequent to a query being raised for retrieving certain data items from the repository, the data items retrieved (from the repository) as a response to the query are assigned a TTL period and stored in a cache memory module. The TTL period is typically decided on an ad-hoc basis and ranges between 2 hours to 24 hours. However, the TTL period based scheme envisaged by prior art caching system does not take into account the volatility associated with querying for data items. For example, the number of queries corresponding to a small yet popular hotel could exceed the number of queries corresponding to a large hotel. Further, queries directed to air travel scheduled a week ahead would obviously exceed the number of queries directed to air travel scheduled a fortnight ahead.

In view of the foregoing there is felt a need for a system that calculates and implements TTL values in such a way that the volatilities associated with the information stored in caching memory modules are efficiently addressed, without having a hearing upon usability of programmed interfaces.

OBJECTS

An object of the present disclosure is to provide a system and method adapted to function in a dynamic pricing environment.

Another object of the present disclosure is to render a system and method that provides flawless customer experience in terms of near real-time availability of accurate information.

Yet another object of the present disclosure is to provide a system and method for managing an inventory shared between multiple non-cooperative web-based, computer-implemented platforms.

Still a further object of the present disclosure is to provide a system and method that brings about a reduction in the end-to-end response time corresponding to web based computer implemented platforms offering products/services for sale.

One more object of the present disclosure is to provide a system and method that minimizes caching errors in web based computer implemented platforms offering products/services for sale.

Yet another object of the present disclosure is to provide a system and method adapted to respond in a consistent manner to rapid changes associated with (online) behavior of users accessing web based computer implemented platforms offering products/services for sale.

One more object of the present disclosure is to provide a self-correcting caching system.

Still a further object of the present disclosure is to provide a system and method that solve the problem of implementing an effective caching mechanism in federated computer network architecture.

One more object of the present disclosure is to provide a system and method that dynamically configure a TTL (Time-To-Live) value, in order to ensure that the data/information stored in cache memory remains accurate.

SUMMARY

The present disclosure envisages a dynamic caching system. The dynamic caching system is communicably coupled to a master database which stores repetitively accessed data points. The master database is simultaneously accessible to a plurality of computer implemented platforms, preferably non-cooperative computer platforms. The master database transmits the frequently accessed data points to the caching system. The caching system subsequently receives the frequently accessed data points. The caching system includes a user engine configured to receive a query from a user of computer implemented platform. The received query is subsequently processed by an orchestrator. The orchestrator selectively searches the caching system for (stored) data points relevant to the query. Subsequently, the orchestrator retrieves data points deemed relevant to the query.

The data points retrieved by the orchestrator are subsequently processed by a decision engine. Subsequent to processing retrieved data points, the decision engine determines the cache age corresponding to each of the retrieved data points. The cache age (of data points) is a difference between the time when the relevant data points were received into the caching system from the master database and the time when the relevant data points were retrieved from the caching system by the orchestrator. The decision engine dynamically sets determined cache age as a Time to Live (TTL) period for the query corresponding to the relevant data points, such that every query directed to said relevant data points within said cache age incorporates an accuracy measurement equivalent to a predetermined value.

BRIEF DESCRIPTION OF DRAWINGS

The other objects, features and advantages will be apparent to those skilled in the art from the following description of the preferred embodiment and the accompanying drawings in which.

DETAILED DESCRIPTION

To obviate the disadvantages and drawbacks discussed in the 'background' section, the present disclosure envisages a dynamic caching system. The dynamic caching system envisaged by the present disclosure provides a dynamic TTL based scheme involving defining a (data) accuracy target for each response linked to a data query, and setting a separate TTL period for data points incorporated in the said response.

Figure 1:
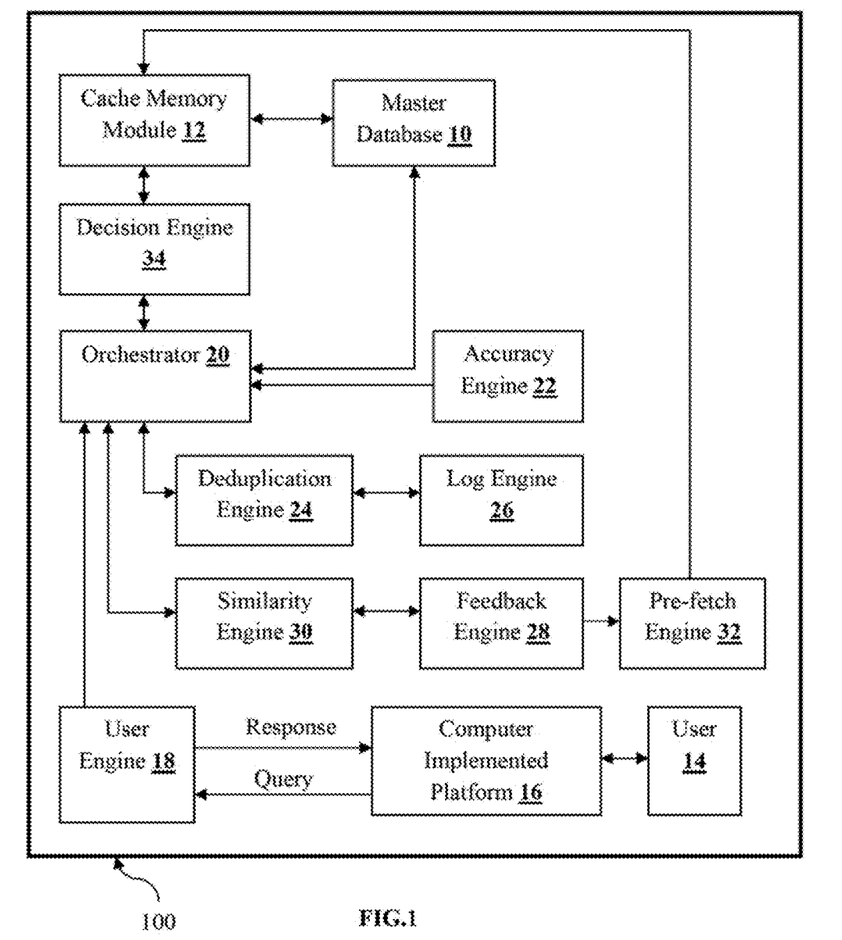
FIG. 1 is a block diagram illustrating the components of a dynamic caching system, in accordance with the present disclosure.

Referring to FIG. 1, there is shown a dynamic caching system 100. The caching system 100, in accordance with the present disclosure includes a master database denoted by reference numeral 10. The master database 10 is preferably accessed by a plurality of computer implemented platforms, preferably non cooperative computer implemented platforms which are oblivious to the functioning of other similar computer implemented platforms. The computer implemented platform can be one of an online travel portal or an online marketplace or an online travel aggregator or an online provider of bus/rail/air tickets. For the sake of brevity, FIG. 1 illustrates only one non-cooperative computer implemented platform 16, which cooperates with the master database 10 to receive data and information necessary for its implementation and functioning. The data items relevant to the functioning of the computer implemented platform 16 include but are not restricted to information corresponding to availability of commodities for purchase and the corresponding price, information corresponding to availability of air/rail/bus tickets and corresponding prices, information corresponding to availability of hotel accommodation and corresponding prices.

The caching system 100, in accordance with the present disclosure further includes a cache memory module denoted by reference numeral 12. Preferably, every computer implemented platform manages a dedicated cache memory module. However for ease of explanation, only one cache memory module 12 and only one computer implemented platform 16 has been illustrated in FIG. 1, and the corresponding description. The cache memory module 12 creates and manages a replica/copy of the information which is stored in the master database 10 and frequently queried/accessed by the computer implemented platform 16. The frequently queried/accessed information is stored as data points, in the cache memory module 12. Typically, whenever a query from a computer implemented platform 16 is directed to any of the frequently accessed data points, the said frequently accessed data points are retrieved directly from the cache memory module 12 instead of querying the master database 10.

In accordance with the present disclosure, the computer implemented platform 16 (referred to as 'platform' hereafter) is accessible to a user 14. In an exemplified scenario, the user 14 launches a query for a product/service being sold/made available on the computer implemented platform 16. The query generated by the user 14, for example, may be directed towards booking a hotel accommodation in a metro city for three people. The said query form the user 14, is transmitted to the platform 16 via a user interface (not shown in figures). Subsequently, the user engine 18 processes the query generated by the user 14, and transmits the query to an orchestrator 20 for further processing.

The orchestrator 20 subsequently processes the query and determines whether the data points relevant to the said query are to be fetched from the cache memory module 12 or whether the data points relevant to the said query are to be fetched from the master database 10. The orchestrator 20 cooperates with an accuracy engine 22 to determine whether to bypass the cache memory module 12 and retrieve the data points from the master database 12, or otherwise. The accuracy engine 22 determines, preferably dynamically, an accuracy value for every query directed to the master database 10 as well as the cache memory module 12. For example, any query deemed to materialize into a sale would be allocated an accuracy value of 97%, and any query that is deemed to correspond to only online browsing would be allocated an accuracy value of 80%. The queries that are deemed to materialize into sales are assigned a higher accuracy value, by the accuracy engine 22.

Typically, queries that correspond to on-line purchasing (queries that are deemed to materialize into a product/service sale) are accorded a higher accuracy value and directed to the master database 10 which always maintains updated data necessitated by the platform 14, while bypassing the cache memory module 12. Further, queries that do not materialize into a sale and correspond to only online browsing are accorded a lower accuracy value and directed to the cache memory module 12. Before deciding to bypass the cache memory module 12 in case of queries corresponding to online purchasing, the accuracy engine 22 takes into consideration the purported penalties to be incurred (financial or otherwise) in case of retrieving inaccurate data points in respect of the query, and the data coverage provided by each of the data points considered pertinent to the query.

Subsequently, if it is decided (by the accuracy engine 22) that the data points relevant to the query are to be fetched from the master database 10, then the orchestrator 20 generates a 'cache miss' signal and transmits the 'cache miss' signal to the cache memory module 12 thereby a cache memory bypass. Subsequently, the orchestrator 20 fetches the data points (deemed pertinent to the query) from the master database 10, and renders it to the user 14 via the user engine 18. The orchestrator selectively updates the cache memory module 12 with the data points (deemed pertinent to the query) retrieved from the master database 10. Further, if the orchestrator 20 determines that the data points relevant to the query are to be procured from the cache memory module 12, then the orchestrator 20 accesses the cache memory module 12 through a data engine (not shown in figures) and retrieves via the data engine the said relevant data points from the cache memory module 12.

The caching system 100 in accordance with the present disclosure further includes a deduplication engine 24. The deduplication engine 24 cooperates with the orchestrator 20 to receive the relevant data points. The data points typically include static data as well as dynamic data. The deduplication engine 24 processes the relevant data points retrieved by the orchestrator 20, and identifies static data and dynamic data from the relevant data points. Static data includes data that does not change based on the nature of a query. An example of static data in the context of hotel accommodations would be the data corresponding to 'description of the hotel' and the 'address of the hotel'. Further, dynamic data includes data that does change depending upon the nature of the query. An example of dynamic data in the context of hotel accommodations would be the data corresponding to 'pricing of hotel accommodations', and 'availability of hotel accommodations'. Further, the deduplication engine 24 preferably interlinks at least the dynamic data embedded in the relevant data points, with the corresponding query. Further, the dynamic data embedded in the relevant data points, and the query linked thereto are stored in a log engine 26.

In accordance with the present disclosure, in the event that the orchestrator 20 determines the data points stored in the cache memory module to be irrelevant/inaccurate with reference to the query, the orchestrator 20 triggers a similarity engine 28, and instructs the similarity engine 28 to search for data points pertinent to the query specified by the user 14. The similarity engine 28, in accordance with the present disclosure cooperates with the master database 10 and identifies, from the master database 10, the data points that can be enlisted as an accurate/relevant response to the query provided by the user 14. Additionally, the similarity engine 28 also identifies data points neighboring the data points deemed relevant to the query of the user, as being relevant. The similarity engine 28 identifies any pair of data points as similar if both the data points are accessed within a same predetermined time frame, or if the values of both the data points change with a same predetermined time frame. Subsequently, the data points enlisted by the similarity engine 26 as being relevant to the query are stored in the log engine 24 along with the relevant data points retrieved by the orchestrator 20 from the cache memory module 12.

In accordance with the present disclosure, a feedback engine denoted by reference numeral 30 cooperates with the log engine 24 and continuously analyzes the queries and the data points stored in the log engine 24. The feedback engine 30 compares the data points retrieved from the cache memory module 12 in response to a query provided by the user 14, with similar data points stored in the master database 10, and determines whether the data points stored in the master database system 10 are as accurate as the data points retrieved from the cache memory module 12, with reference to the query. Subsequently, the feedback engine 30 combines the data points retrieved from the master database 10 with the data points stored in the cache memory module 12, only in the event that the data points retrieved from the cache memory module 12 are determined to be inaccurate in view of the query. Further, the feedback engine 30 selectively deletes the data points (stored in the cache memory module 12), whose age has exceeded a predetermined threshold value.

In accordance with the present disclosure, the feedback engine 30 compares the data points (stored in the master database 10) identified by the similarity engine 26 as relevant to the query provided by the user 14, with the data points stored in the cache memory module 12 and deemed relevant to said query. The feedback engine 30 determines whether the data points stored in the cache memory module 12 are as accurate as the data points identified by the similarity engine 26. The feedback engine 30 combines the data points retrieved from the cache memory module 12 with the data points identified by the similarity engine 28, only in the event that the data points retrieved from the cache memory module 12 are determined to be inaccurate, with reference to the query provided by the user 14.

In accordance with the present disclosure, the caching system 100 further includes a pre-fetch engine 32. The pre-fetch engine 32 cooperates with the similarity engine 28 and cache memory module 12. The pre-fetch engine 32 loads the data points identified by the similarity engine 28, onto the cache memory module 12. Further, the pre-fetch engine 32 selectively implements a data refresh function for the data points stored in the cache memory module 12, based on at least one of frequency of access/querying of data points, utility of each of the data points in terms of answering a query generated by the user 14, and relevance of each of the data points to the query generated by the user.

Subsequently, the query provided by the user 14, and the data points identified by the similarity engine 28 and the orchestrator 20 are stored in the log engine 24. The orchestrator 20 subsequently retrieves from the log engine 24 the data points relevant to the query provided by the user 14, and subsequently renders the retrieved data points to the user 14 via the user engine 18 communicably coupled to the platform 14.

The caching system 100, in accordance with the present disclosure further includes a decision engine 34. The decision engine 34 cooperates with the orchestrator and identifies the data points deemed as relevant, by the orchestrator 20, to the query provided by the user 14. The decision engine 34 subsequently determines a cache age corresponding to the data items deemed as relevant by the orchestrator 20. The cache age is a difference between the time when the relevant data points were received into the cache memory module 12 from the master database 10 and the time when the relevant data points were retrieved from the cache memory module 12 by the orchestrator 20. The decision engine 34 further sets the cache age as a Time to Live (TTL) period for the query corresponding to the relevant data points (identified by the orchestrator), such that every query directed to said relevant data points within said cache age satisfies an accuracy value predetermined by the accuracy engine 24.

Figure 2:
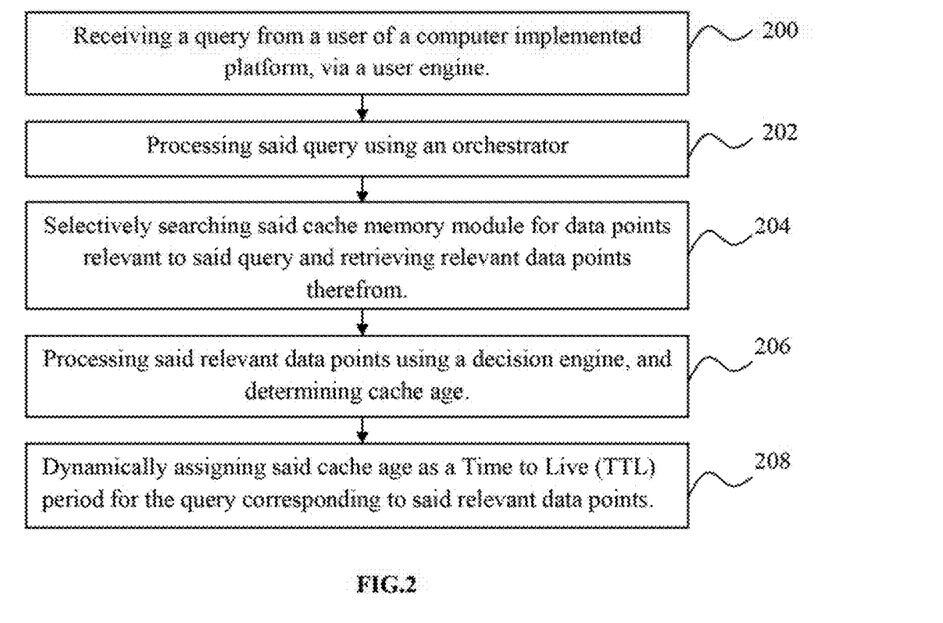
FIG. 2 is a flow chart illustrating the steps involved in a method for implementing dynamic caching system.

Referring to FIG. 2, there is shown a flow chart illustrating the steps involved in the method for implementing a dynamic caching system. The method, in accordance with the present disclosure comprises the followings steps:

receiving a query from a user of a computer implemented platform, via a user engine (200);

processing the query using an orchestrator (202);

selectively searching the cache memory module, using the orchestrator, for data points relevant to the query and retrieving, relevant data points therefrom (204);

processing the relevant data points using a decision engine, and determining cache age based on the relevant data points, the cache age being a difference between the time when the relevant data points were received into the caching system from the data inventory and the time when the relevant data points were retrieved from the cache memory module (206); and dynamically assigning the cache age as a Time to Live (TTL) period for the query corresponding to the relevant data points, such that every query directed to the relevant data points within the cache age satisfies a predetermined accuracy value (208).

In accordance with the present disclosure, the step of processing, the query using an orchestrator further includes the steps of generating instructions using an accuracy engine, the instructions enabling the orchestrator to selectively search the cache memory module for data points relevant to the query, the instructions enabling the orchestrator to selectively bypass the cache memory module, and search a master database instead for data points relevant to the query.

In accordance with the present disclosure, the method further includes the steps of defining an accuracy value for every query directed to the data points stored in the cache memory module; and defining an accuracy value for every query directed to the data points stored in the master database.

In accordance with the present disclosure, the method further includes the following steps:

processing the relevant data points using a deduplication engine;

segregating static parts of the data points from dynamic parts of the data points, using the deduplication engine;

interlinking dynamic parts of the data points with the corresponding query, using the deduplication engine; and storing the query and the dynamic parts of the data points interlinked to the query, in a log engine.

In accordance with the present disclosure, the method further includes the following steps:

using a similarity engine to identify from the master database, the data points similar to the data points stored in the cache memory module;

comparing the data points retrieved from the caching system in response to a query, with the data points stored in the master database and relevant to the query, using a feedback engine;

determining, using the feedback engine whether the data points stored in the master database system are as accurate as the data points retrieved from the cache memory module, in view of the query; and combining, using the feedback engine, the data points retrieved from the master database with the data points stored in the cache memory module, only in the event that the data points retrieved from the cache memory module are determined to be inaccurate.

In accordance with the present disclosure, the method further includes the following steps:

selectively loading the data points stored in the master database and identified as similar to the data points retrieved from the cache memory module, onto the cache memory module, using a pre-fetch engine;

loading onto the cache memory module via the pre-fetch engine, the data points bound to expire after elapse of a predetermined time interval but deemed relevant to the query; and selectively implementing a data refresh function for the data points stored in the cache memory module, using the pre-fetch engine.

In accordance with the present disclosure, the step of generating instructions using an accuracy engine, further includes the step of generating instructions based on at least one of impact of inaccuracy of the data points, and data coverage provided by the data points in computing the TTL.

In accordance with the present disclosure, the step of segregating static portions of the data points from dynamic portions of the data points, further includes the steps of identifying the static portions by eliminating from the relevant data points, random noise not following any fixed pattern and dynamic portions deemed to follow a fixed pattern.

In accordance with the present disclosure, the step of using a using a similarity engine to identify from the master database the data points similar to the data points stored in the cache memory module, further includes the step of identifying the data points similar to the data points stored in the cache memory module, based on at least one of time of access of the data points and time bound changes in the data points.

In accordance with the present disclosure, the method further includes the following steps:

selectively removing from the cache memory module, the data points deemed inaccurate in view of the query;

comparing the data points identified by the similarity engine in response to a query, with the data points stored in the cache memory module and deemed relevant to the query, and determining whether the data points stored in the cache memory module are as accurate as the data points identified by the similarity engine, in respect of the query; and combining the data points retrieved from the cache memory module with the data points identified by the similarity engine, only in the event that the data points retrieved from the cache memory module are determined to be inaccurate in view of the query.

In accordance with the present disclosure, the step of selectively implementing a data refresh function, further includes the step of implementing a data refresh function based on at least one of frequency of access of data points, utility of each of the data points and relevance of each of the data points.

The foregoing description of the specific embodiments will so fully reveal the general nature of the embodiments herein that others can, by applying current knowledge, readily modify and/or adapt for various applications such embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modifications.

TECHNICAL ADVANTAGES

The technical advantages envisaged by the present disclosure include the realization of a system and method adapted to function in a dynamic pricing environment. The present disclosure envisages a dynamically correcting, cache memory for non-cooperative systems. The present disclosure envisages a system that is capable of dynamically correcting the cache memory by dynamically reflecting (in the cache memory) the modifications that are brought about in the data/information to be stored in the cache memory. Further, the system envisaged by the present disclosure refreshes the cache memory at predetermined time intervals and also based on predetermined criteria, thereby ensuring a high cache hit rate. The system and method envisage selectively bypassing the cache memory for certain user queries prioritized based on predetermined criteria. Further, the system and method ensures that the data/information stored in the cache memory is deduplicated. Further, the system and method provide flawless customer experience in terms of near real-time availability of accurate information. The system and method effectively and efficiently manages an inventory (comprising information) shared between multiple non-cooperative web-based, computer-implemented platforms. The system and method bring about a reduction in the end-to-end response time corresponding to web based computer implemented platforms offering products/services for sale. Further, the system and method minimize caching errors in web based computer implemented platforms offering products/services for sale. The system and method respond in a consistent manner to rapid changes associated with (online) behavior of users accessing web based computer implemented platforms offering products/services for sale. The system and method dynamically configure TTL (Time-To-Live) values, in order to ensure that the data/information stored in cache memory remains accurate.

What is claimed is:

1. A computer-implemented dynamic caching system, said dynamic caching system comprising:
    at least one processor; and
    at least one computer-readable memory communicably coupled to said processor, said memory storing predefined, executable computer program code, which when executed by said processor, causes the processor to:
        access a master database storing at least data points repetitively accessed via a plurality of mutually non-cooperative computer implemented platforms;
        trigger a cache memory to cooperate with said master database and thereby receive from said master database, at least repetitively accessed data points, said processor further triggering storage of said repetitively accessed data points received from said master database, on said cache memory;
        trigger a user engine to receive a query from a user of at least one of said mutually non-cooperative computer implemented platforms;

trigger an orchestrator to cooperate with said user engine and thereby receive and process said query, and selectively search said cache memory and amongst said repetitively accessed data points stored therein, for data points relevant to said query, and consequentially retrieve relevant data points from said cache memory;

trigger a decision engine to process said relevant data points, and further trigger said decision engine further to determine a cache age based on said relevant data points, said cache age being a difference between a time when the relevant data points were received into the cache memory from the master database and a time when the relevant data points were retrieved from the cache memory module by said orchestrator in response to said query, and dynamically set said cache age as a Time to Live (TTL) period for said query corresponding to said relevant data points, such that every query, directed to said relevant data points within said cache age satisfies a predetermined accuracy value; and trigger a de-duplication engine to further process said relevant data points and:
identify static portions of said relevant data points, by eliminating from said relevant data points, random noise not following any fixed pattern and dynamic portions deemed to follow a fixed pattern; and
segregate said static portions from said dynamic portions, and interlink said dynamic portions of said relevant data points with said query.

2. The dynamic caching system as claimed in claim 1, wherein said processor further triggers an accuracy engine to selectively instruct said orchestrator to access and search said cache memory for said data points relevant to said query, and selectively instruct said accuracy engine to bypass said cache memory, and instead search said master database for said data points relevant to said query.

3. The dynamic caching system as claimed in claim 2, wherein said processor further triggers said accuracy engine to define an accuracy value for every query directed to said repetitively accessed data points stored in said cache memory, and to define an accuracy value for every query directed to said repetitively accessed data points stored in said master database.

4. The dynamic caching system as claimed in claim 2, wherein said accuracy engine instructs said orchestrator to bypass said cache memory, based on at least one of penalty incurred due to inaccuracy of said repetitively accessed data points, and data coverage provided by said repetitively accessed data points in computing said TTL.

5. The dynamic caching system as claimed in claim 1, wherein said processor further triggers a log engine to cooperate with said de-duplication engine, and thereby receive and store said query and at least the dynamic portions of said relevant data points interlinked to said query.

6. The dynamic caching system as claimed in claim 1, wherein said processor further triggers a similarity engine to cooperate with said master database, and thereby identify from the master database, repetitively accessed data points similar to said relevant data points retrieved from said cache memory, said processor further configured to trigger said similarity engine to identify a pair of repetitively accessed data points as similar, if said pair of repetitively accessed data points are accessed within a pre-determined time window, and if values for said pair change within said pre-determined time window.

7. The dynamic caching system as claimed in claim 6, wherein said processor triggers a feedback engine to:
compare said relevant data points retrieved from said cache memory in response to said query, with similar repetitively accessed data points stored in said master database and deemed relevant to said query, and determine whether said similar repetitively accessed data points stored in said master database are as accurate as the said relevant data points retrieved from said cache memory in response to said query;
combine said similar repetitively accessed data points stored in said master database, with said relevant data points retrieved from said cache memory, only in the event that said relevant data points retrieved from said cache memory are determined to be inaccurate in view of said query, and selectively delete said repetitively accessed data points stored in said cache memory, in an event the age of any of said repetitively accessed data points exceeds a predetermined threshold value;
compare said repetitively accessed data points identified by said similarity engine as similar, with said relevant data points retrieved from said cache memory and deemed relevant to said query, and determine whether said relevant data points are as accurate as said repetitively accessed data points identified by said similarity engine as similar; and
combine said relevant data points retrieved from said cache memory with said repetitively accessed data points identified by said similarity engine as similar, only in an event said relevant data points retrieved from said cache memory are determined to be inaccurate in view of said query.

8. The dynamic caching system as claimed in claim 1, wherein said processor further triggers a pre-fetch engine to:
selectively load onto said cache memory, as a response to said query, said repetitively accessed data points stored in said master database and identified as similar to said relevant data points retrieved from the cache memory, in view of said query;
load onto said cache memory module, repetitively accessed data points stored in said master database and bound to expire after a predetermined Time-to-Live period, but deemed relevant to said query; and
selectively implement a data refresh function on said repetitively accessed data points loaded onto said cache memory.

9. The dynamic caching system as claimed in claim 8, wherein said processor further triggers said pre-fetch engine to implement a data refresh function based on at least one of frequency of access of said repetitively accessed data points, utility and relevance of each of said repetitively accessed data points with respect to said query.

10. The dynamic caching system as claimed in claim 1, where said master database is maintained by an online supplier and said non-cooperative computer implemented platform is an online commerce platform and said TTL is computed based on at least one of rate of change of inventory availability and inventory price.

11. The dynamic caching system as claimed in claim 1, wherein the static portions of said relevant data points comprise data item description, data item pictures, information corresponding to cancellation and return policies relevant to predetermined online commerce platforms, and wherein the dynamic portions of said relevant data points comprise information corresponding to availability and price relevant to said predetermined online commerce platforms.

12. The dynamic caching system as claimed in claim 1, wherein said processor instructs said orchestrator to bypass said cache memory for queries corresponding to on-line purchasing, and instructs said orchestrator to access said cache memory in respect of queries corresponding to on-line browsing.

13. A computer-implemented method for implementing a dynamic caching system, said method comprising the following steps:
- triggering storage of at least data points repetitively accessed via a plurality of mutually non-cooperative computer implemented platforms, on a master database;
- triggering a cache memory to cooperate with said master database and thereby receive from said master database, at least repetitively accessed data points, and further triggering said cache memory to store said repetitively accessed data points;
- receiving a query from a user of at least one of said mutually non-cooperative computer implemented platform, via a user engine;
- processing said query using an orchestrator;
- selectively searching said cache memory and amongst said repetitively accessed data points stored therein, using said orchestrator, for data points relevant to said query, and consequentially retrieving, relevant data points from said cache memory;
- processing said relevant data points using a decision engine, and determining a cache age, said cache age being a difference between a time when the relevant data points were received into the cache memory from the master database and a time when the relevant data points were retrieved from the cache memory in response to said query;
- dynamically assigning said cache age as a Time to Live (TTL) period for the query corresponding to said relevant data points, such that every query directed to said relevant data points within said cache age satisfies a predetermined accuracy value;
- processing said relevant data points using a de-duplication engine and identifying static portions of said relevant data points, by eliminating from said relevant data points, random noise not following any fixed pattern and dynamic portions deemed to follow a fixed pattern; and
- segregating said static portions from said dynamic portions, and interlinking said dynamic portions with said query.

14. The method as claimed in claim 13, wherein the step of processing said query using an orchestrator further includes the steps of generating instructions using an accuracy engine, said instructions enabling said orchestrator to selectively search said cache memory for said repetitively accessed data points relevant to said query, said instructions enabling said orchestrator to selectively bypass said cache memory, and search said master database instead for said repetitively accessed data points relevant to said query.

15. The method as claimed in, claim 14, wherein the step of generating instructions using an accuracy engine, further includes the step of generating instructions based on at least one of impact of inaccuracy of said repetitively accessed data points, and data coverage provided by said repetitively accessed data points in computing said TTL.

16. The method as claimed in claim 13, wherein the method further includes the steps of defining an accuracy value for every query directed to the data points stored in said cache memory, and defining an accuracy value for every query directed to the data points stored in said master database.

17. The method as claimed in claim 13, wherein the method further includes the following steps:
- interlinking dynamic portions of said relevant data points with the corresponding query, using said de-duplication engine; and
- storing said query and at least the dynamic portions of said relevant data points interlinked to said query, in a log engine.

18. The method as claimed in claim 17, wherein the step of segregating static portions of said relevant data points from dynamic portions of said relevant data points, further includes the steps of identifying said static portions by eliminating from said relevant data points, random noise not following any fixed pattern and said dynamic portions deemed to follow a fixed pattern.

19. The method as claimed in claim 13, wherein the method further includes the following steps:
- using a similarity engine to identify from the master database, said repetitively accessed data points similar to said relevant data points retrieved from said cache memory;
- comparing said relevant data points retrieved from said cache memory in response to said query, with similar repetitively accessed data points stored in said master database, using a feedback engine;
- determining, using the feedback engine, whether said similar repetitively accessed data points stored in said master database are as accurate as said relevant data points retrieved from said cache memory, in response to said query; and
- combining, using the feedback engine, said similar repetitively accessed data points retrieved from said master database, with the said relevant data points retrieved from said cache memory, only in an event said relevant data points retrieved from said cache memory are determined to be inaccurate.

20. The method as claimed in claim 19, wherein the step of using a similarity engine to identify from the master database said repetitively accessed data points similar to said relevant data points retrieved from said cache memory, further includes the step of identifying said repetitively accessed data points similar to said relevant data points stored in said cache memory, based on at least one of time of access of said repetitively accessed data points and time bound changes in said repetitively accessed data points.

21. The method as claimed in claim 19, wherein the method further includes the following steps:
- selectively removing from said cache memory, said repetitively accessed data points deemed inaccurate in view of said query;
- comparing the data points identified as similar by said similarity engine in response to a query, with said relevant data points retrieved from said cache memory, and determining whether said relevant data points retrieved from said cache memory are as accurate as the data points identified by said similarity engine as similar, in view of said query; and
- combining said relevant data points retrieved from said cache memory with the data points identified by said similarity engine as similar, only in an event said relevant data points retrieved from said cache memory are determined to be inaccurate in view of said query.

22. The method as claimed in claim 13, wherein said method further includes the following steps:

selectively loading said repetitively accessed data points stored in said master database and identified as similar to said relevant data points retrieved from the cache memory, onto the cache memory, using a pre-fetch engine;

loading onto said cache memory from said master database and via said pre-fetch engine, said repetitively accessed data points bound to expire after elapse of a predetermined Time-to-Live period but deemed relevant to said query; and selectively implementing a data refresh function upon said repetitively accessed data points loaded onto said cache memory module, using said pre-fetch engine.

23. The method as claimed in claim 22, wherein the step of selectively implementing a data refresh function, further includes the step of implementing a data refresh function based on at least one of frequency of access of said repetitively accessed data points, utility of each of said repetitively accessed data points and relevance of each of said repetitively accessed data points with respect to said query.

* * * * *